C. P. STEINMETZ.
ROTARY CONVERTER.
APPLICATION FILED MAR. 20, 1909.
981,134.
Patented Jan. 10, 1911.
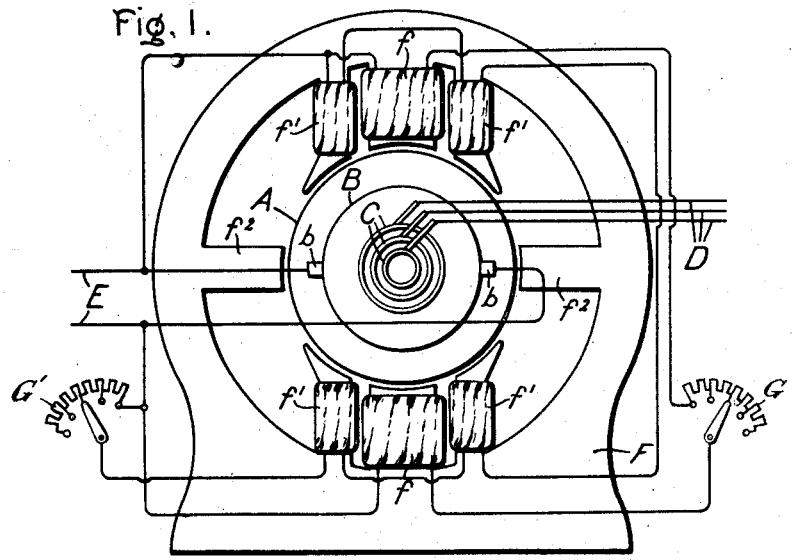
Fig. 1.
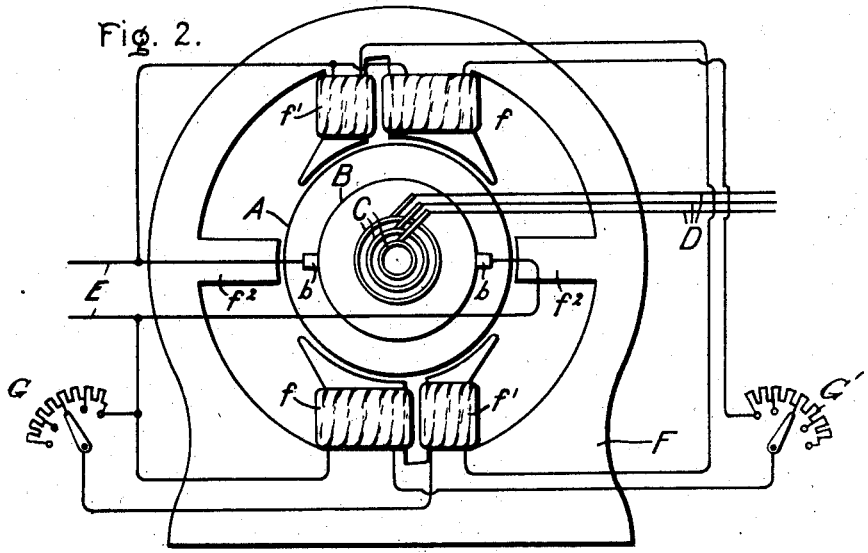
Fig. 2.
WITNESSES:
J. Earl Ryan.
J. Ellis Glen.
INVENTOR
CHARLES P. STEINMETZ.
BY 
ATT'Y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ROTARY CONVERTER.

981,134.  Specification of Letters Patent.  Patented Jan. 10, 1911.

Application filed March 20, 1909. Serial No. 484,688.

*To all whom it may concern:*

Be it known that I, CHARLES P. STEINMETZ, a citizen of the United States, residing at Schenectady, county of Schenectady, State of New York, have invented certain new and useful Improvements in Rotary Converters, of which the following is a specification.

My invention relates to rotary converters of what is now known as the "split-pole" type; that is, in which the field poles and their windings are so arranged that the flux distribution in the field poles may be varied so as to vary the relative amounts of alternating and direct current voltages delivered to and taken from the machine.

The object of my invention is to improve commutation in machines of this type.

In Patent No. 940,210, issued to me November 16, 1909, I have disclosed the application to certain types of machines of unwound commutating poles for improving commutation. In that application I have pointed out the fact that where the ampere turns due to the generator and motor currents in the armature are unequal, as in the case with an ordinary rotary converter delivering or receiving mechanical power, a resultant armature reaction exists, which, if the current flowing through the commutator is less than the current flowing through the collector rings, is in the proper direction for magnetizing the commutating poles, so as to assist in the commutation of the current flowing through the commutator. In the case of a rotary converter of the split-pole type similar conditions may exist without any transfer of mechanical power from or to the machine. For instance, if the converter is converting alternating current to direct, and at the same time raising the voltage of the direct current delivered, then, since the volt amperes are approximately the same at the direct and alternating current ends, and since the direct voltage is relatively increased by the connections of the field windings, the direct current is correspondingly relatively decreased, so that the ampere turns, due to the alternating motor current, are in excess of the ampere turns in the armature due to the direct generator current. If such a machine is so operated, unwound commutating poles will be magnetized by the excess armature reaction of the motor current in a direction to assist the commutation of the direct generator current. Similarly, if the machine is employed as an inverted converter, the field connections being the same as heretofore assumed so that the alternating voltage delivered is reduced relative to the direct voltage supplied, the alternating generator current delivered will be increased relatively to the direct motor current, and the machine will, therefore, have a resultant armature reaction in the proper direction for magnetizing the unwound commutating poles.

In one type of split-pole rotary converter, the voltage variation is obtained by varying the distribution of the field flux in such a manner as simply to vary the wave shape of the induced alternating current voltage, the effective line of magnetization not being shifted. In another type of split pole rotary, which is now well known in the art, a wider range of voltage variation is obtained by so arranging the field coils that the effective line of field magnetization is actually shifted with respect to the commutator brushes. In a machine of this type a component of field magnetization may exist along the line of the commutator brushes in a direction opposing the armature reaction due to the current flowing through the commutator, and this component of the field magnetization adds itself to the magnetizing effect or armature reaction of the alternating current in the armature, and the sum of these two effects may be in excess of that due to the direct current flowing through the commutator, even though that direct current is in excess of the alternating current. In such a machine unwound commutating poles may have a beneficial effect on commutation, although the machine is being used to transform alternating current to direct current of relatively lower voltage and consequently greater amperage.

My invention will best be understood by reference to the accompanying drawings, in which—

Figure 1 shows diagrammatically a split-pole rotary converter arranged in accordance with my invention, and Fig. 2 shows my invention applied to a different form of split-pole rotary.

In the drawings, A represents the armature, which is provided with a commutator B and commutator brushes *b b*.

C represents collector rings.

D represents leads through which alternating current is supplied to or taken from the collector rings, and E represents leads through which direct current is supplied to or taken from the commutator.

F represents the field magnet, the main poles of which are divided in planes substantially parallel with the armature shaft. Main field coils $f$ are placed around the central portions of the poles, and regulating coils $f'$ around the outer divisions of the poles. As is well understood in the art, the relative voltages at the commutator brushes and collector rings may be varied by varying the relative current strengths through the main field coils $f$ and the regulating coils $f'$, so as to vary the wave shape of the induced alternating voltage. I have indicated rheostats G and G' in circuit with the coils $f$ and $f'$ for the purpose of regulating the relative strengths in those coils. If alternating current is being delivered to the machine through the collector rings C, and the field coils are so connected that the voltage delivered through the commutator and the leads E is relatively increased so that the amount of direct current is relatively decreased, there will be a resultant armature reaction in the machine which is opposed to the reaction which would be produced by the direct generator current alone, and which, therefore, is in the proper direction for magnetizing the unwound commutating poles $f^2$, so as to improve the commutation of the direct current delivered through the commutator. Precisely similar conditions exist if the machine is operated as an inverted rotary with the same connections of field coils, so that the direct current delivered to the machine through the leads E is relatively increased in voltage and decreased in amperage with respect to the alternating current delivered by the machine through the collector rings and leads D.

If a machine of the type shown in Fig. 1 had its field coils so connected as to give a relatively reduced direct current voltage, as compared with the alternating current voltage the resultant armature reaction in the machine would be such as to magnetize the commutating poles in the wrong direction for commutation unless mechanical power were taken from or delivered to the armature. In such a machine, as is shown in Fig. 2, however, a relatively reduced direct voltage may be obtained while the magnetization of the commutating poles remains in the proper direction. In Fig. 2 the main poles are divided into two sections only, so that as the currents in the two sets of coils $f$ and $f'$ are varied relatively, the resultant magnetization of the field does not remain fixed in space, but is shifted in one direction or the other. When the magnetization is not at right-angles to the line of the brushes $b\ b$ there is a component of the field magnetization along the line of the brushes, and if the machine is properly designed this component may be made of sufficient amount so that added to the magnetizing effect of the alternating current flowing through the collector rings it over-balances the magnetizing effect of the direct current flowing through the commutator, so that, although the direct current is increased and its voltage decreased with respect to the alternating current, the resultant magnetization in the armature is nevertheless in the proper direction for magnetizing the unwound commutating poles $f^2$ so as to improve commutation.

I do not desire to limit myself to the particular construction and arrangement of parts here shown, but aim in the appended claims to cover all modifications which are within the scope of my invention.

What I claim as new and desire to secure by Letters Patent of the United States, is,—

1. A rotary converter having an armature provided with a commutator and collector rings, main field poles divided in planes substantially parallel with the armature shaft, separate field coils on different portions of said main poles whereby the fluxes in said portions may be relatively varied, and unwound commutating poles at the points of commutation of the current flowing through the commutator.

2. A rotary converter having an armature provided with a commutator and collector rings, main field poles, windings adapted to vary the flux distribution in the main poles so as to vary the relative amounts of the voltages at the commutator and collector rings, and unwound commutating poles at the points of commutation of the current flowing through the commutator.

In witness whereof, I have hereunto set my hand this 15th day of March, 1909.

CHARLES P. STEINMETZ.

Witnesses:
JOSEPH L. R. HAYDEN,
T. W. NOONAN.